(12) United States Patent
Wallace et al.

(10) Patent No.: US 12,017,862 B2
(45) Date of Patent: Jun. 25, 2024

(54) MAGNETIC BASED CONVEYOR BELT SUBSEGMENT MONITORING SYSTEMS AND METHODS

(71) Applicant: ContiTech USA, Inc., Fairlawn, OH (US)

(72) Inventors: Jack Bruce Wallace, Powell, OH (US); Jacques Frederick Basson, Braga (PT)

(73) Assignee: ContiTech USA, Inc., Fairlawn, OH (US)

(*) Notice: Subject to any disclaimer, the term of this patent is extended or adjusted under 35 U.S.C. 154(b) by 0 days.

(21) Appl. No.: 17/657,353

(22) Filed: Mar. 30, 2022

(65) Prior Publication Data

US 2023/0312262 A1    Oct. 5, 2023

(51) Int. Cl.
*B65G 43/02* (2006.01)
*B65G 15/36* (2006.01)

(52) U.S. Cl.
CPC ............. *B65G 43/02* (2013.01); *B65G 15/36* (2013.01); *B65G 2203/0275* (2013.01); *B65G 2203/043* (2013.01)

(58) Field of Classification Search
None
See application file for complete search history.

(56) References Cited

U.S. PATENT DOCUMENTS 3,750,129 A * 7/1973 Takeno ................... G01N 27/82
 198/810.02
4,020,945 A * 5/1977 Takeno ................... B65G 43/02
 198/810.02
7,275,637 B2 * 10/2007 Brown ................... G01N 27/83
 198/810.02
7,810,634 B2 * 10/2010 Wallace ................ B65G 15/36
 198/810.02
7,954,632 B2 * 6/2011 Kropf-Eilers .......... B65G 15/32
 198/810.01
8,069,975 B2 * 12/2011 Wallace ................ B65G 43/02
 198/810.02
9,702,853 B2 * 7/2017 Wallace ................ B65G 15/30

(Continued)

FOREIGN PATENT DOCUMENTS

AU       2006337950 B2    4/2012
CN        108082886 A     5/2018

(Continued)

OTHER PUBLICATIONS

Agata Kirjanow-Blazej / Conveyor Belt Damage Detection with the Use of a Two-Layer Neural Network / Jun. 13, 2021.

(Continued)

*Primary Examiner* — Kavel Singh
(74) *Attorney, Agent, or Firm* — Gregory J. Adams; Richard A. Wolf (57) ABSTRACT

A system for monitoring conveyor belts is disclosed. The system includes a generator array, a sensor array and circuitry. The generator array is configured to apply a magnetic field to a plurality of belt subsegments of a segment of a conveyor belt. The sensor array is configured to measure a plurality of magnetic responses for the plurality of belt subsegments. The circuitry is configured to determine whether at least a portion of the segment requires replacement based on the measured plurality of magnetic responses.

20 Claims, 3 Drawing Sheets

(56) References Cited

U.S. PATENT DOCUMENTS

| | | | | |
|---|---|---|---|---|
| 10,294,037 B1 * | 5/2019 | Chu | ................... | B23K 1/008 |
| 10,660,266 B2 * | 5/2020 | Wallace | ................ | G01B 7/046 |
| 11,650,082 B2 * | 5/2023 | Kadoguchi | ............ | G01D 5/147 |
| | | | | 198/502.3 |
| 2008/0133051 A1 | 6/2008 | Wallace et al. | | |
| 2008/0308391 A1 | 12/2008 | May | | |
| 2011/0024269 A1 | 2/2011 | Wallace et al. | | |
| 2020/0262657 A1 | 8/2020 | Sakaguchi | | |

FOREIGN PATENT DOCUMENTS

| | | |
|---|---|---|
| DE | 102006036668 A1 | 2/2008 |
| JP | S51137277 A | 11/1976 |
| JP | 2010260645 A | 11/2010 |
| KR | 20150034567 A | 4/2015 |

OTHER PUBLICATIONS

Yusong Pang / Intelligent Belt Conveyor Monitoring and Control.
International Search Report dated Aug. 1, 2023 of International Application PCT/US2023/065139 on which claims priority this application.

* cited by examiner

MAGNETIC BASED CONVEYOR BELT SUBSEGMENT MONITORING SYSTEMS AND METHODS

FIELD

The field to which the disclosure generally relates is rubber products, such as conveyor belts, exposed to harsh conditions, and in particular using sensors for scanning and/or monitoring damages/defects/tears in steel cord containing rubber products.

BACKGROUND

It is common to employ a heavy-duty conveyor belt for the purpose of transporting product and material. The conveyor belts so employed may be relatively long, for example, on the order of miles, and represent a high-cost component of an industrial material handling operation. Such conveyor belts can possibly be as large as ten feet wide, and possibly as thick as three inches. The main belt material generally is a moderately flexible elastomeric or rubber-like material, and the belt is typically reinforced by a plurality of longitudinally extending metal cables or cords, which are positioned within the belt and extend along the length thereof. Such conveyor belts are often used to transport bulk material below and/or above ground, for example, in mining applications. The conveyor belts and respective drives are susceptible to normal wear and tear as well as damage from the material being transported and/or harsh environmental conditions. In the event the conveyor belt suffers catastrophic damage or otherwise becomes inoperable, the costs of repairing the conveyor belt, cleaning up the spilt material, and related downtime are substantial.

A problem associated with the use of the metal reinforcing cords is that with continued use of the conveyor belts, over time, the cords tend to deteriorate. For example, there may be a crack, generated by impact or some other damage event in the conveyor belt elastomeric material that permits water to contact one or more of the cords, potentially leading to corrosion of the cords. Cord damage may also result from an aggressive impact of the product or material being transported on the conveyor.

Deterioration may also occur from natural wear or possibly fatigue of the metal due to long continued use. Occasionally, the damage to the cord is a total break, while in other instances the damage to the cord may be a partial deterioration that simply weakens the belt.

Because the cords are concealed inside the elastomeric material of the belt, it is challenging to detect any damage. Unfortunately, when the damage is sufficiently severe such that it becomes outwardly visible, a catastrophic failure of the belt may occur. More commonly, the damage may result in a condition that would make further use of the belt dangerous. For this reason, among others, it has generally been a practice in the industry to overdesign the belts by providing an adequately large margin of error which enables the belt to function reasonably safely even if the reinforcing cords are moderately damaged.

Accordingly, it has become common practice to monitor the condition of the conveyor belt. The objective of the monitoring is to identify damage to the reinforcing cords of the conveyor belt so as to reduce the likelihood of complete failure as well as to provide timely repairs and other proactive maintenance. Monitoring effectively increases the life or longevity of the belt. In this regard, one common practice is to have an annual or bi-annual or quarterly analysis conducted on the conveyor belt. To this end, typically a separate entity, other than the owner or user of the conveyor belt, such as the manufacturer of the conveyor belt or some other third party, will come on site and set up a monitoring system in order to collect data on the conveyor belt during use. Data will generally be collected for multiple revolutions of the conveyor belt and may take several hours to complete. Once the data is collected, the outside consultant will leave the on-site location and take the data to another, remote location for analysis. The data will then be reviewed and a report generated providing details on the condition of the conveyor belt and any recommended maintenance. Depending on the consultant, the analysis and report may take anywhere from a few days to a few weeks to complete.

Continuous monitoring systems have been developed that collect data on the conveyor system to determine damage and make recommendations to inspect, repair, or replace portions of conveyor belts. Although continuous monitoring is utilized, such systems suffer from similar deficiencies as those described above. The data can be sent to a remote site for more detailed analysis and reporting to determine the location of damage; is complicated and prone to subjective interpretations and lacks a clear standard on which to base instructions for finding events to inspect, repair, or to replace portions of the conveyor belt. Even if the data is analyzed locally, after the analysis, locations of the identified damage may be difficult to locate along the belt. Generally, the only reference points available from the belt are splice locations, which may be from about 10 feet to in excess of about 1500 feet apart, if not further, making the determination of the location of the identified damage challenging. With belts having multiple intermediate splices, locating the reference points for the damage events can be even more challenging for the belt operator or maintenance personnel.

These continuous monitoring systems are designed to detect and monitor individual damage events over time in order to determine the effect of these individual damages to belt strength by their size and position. The existing systems; however, do not look at the effect of multiple damages and their overall effect on the belt health. This makes it difficult for an operator to look at multiple damaged regions of a conveyor belt and determine where to take action to improve the operational health of the conveyor belt and system. Furthermore, techniques are needed to quantify this process so that an operator can make the best decisions regarding replacing part or multiple parts of the conveyor to keep their conveyor belts operating safely. By identifying portions of a damaged belt that should be replaced, to best impact the operational capabilities and reduce the risk of operating the conveyor, the mines will have a quantitative tool to facilitate their belt management and safety decisions.

DETAILED DESCRIPTION

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one, and the singular also includes the plural unless otherwise stated.

The terminology and phraseology used herein is for descriptive purposes and should not be construed as limiting in scope. Language such as "including", "comprising", "having", "containing", or "involving", and variations thereof, is intended to be broad and encompass the subject matter listed thereafter, equivalents, and additional subject matter not recited.

Also, as used herein, any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Figure 1:
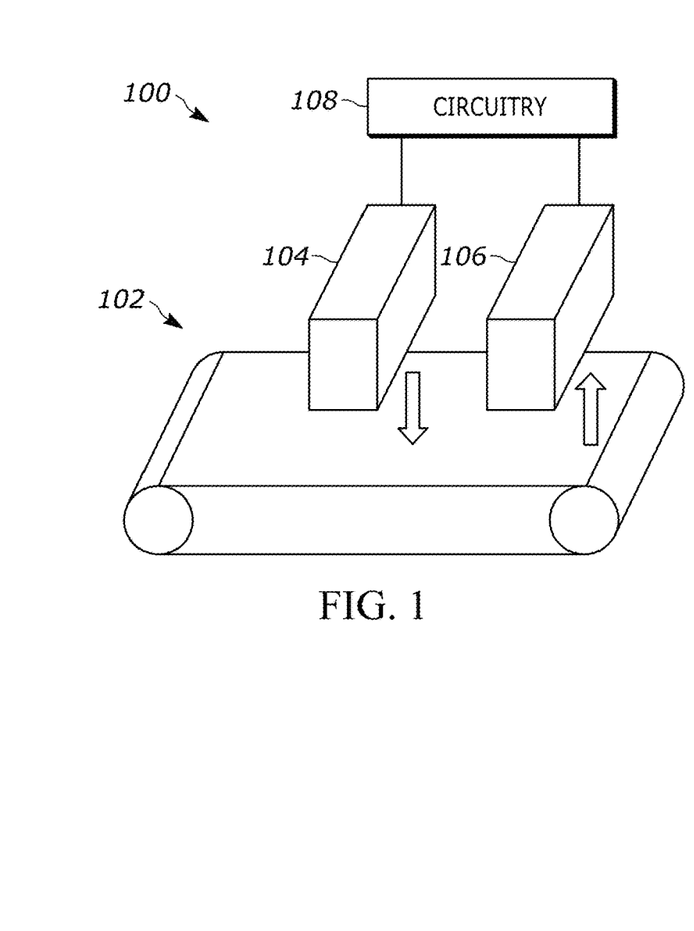
FIG. 1 is a diagram illustrating a system 100 for conveyor belt subsegment monitoring and analysis in accordance with one or more embodiments.

FIG. 1 is a diagram illustrating a system 100 for conveyor belt subsegment monitoring and analysis in accordance with one or more embodiments. The system 100 is provided for illustrative purposes and it is appreciated that suitable variations are contemplated.

Using the system 100 existing system magnetic scan data and a knowledge of the risks associated with a given application to define risk factors for a given amount of data and its location in order to prioritize sections of the belt length for replacement. In the development of this system, known design and application analytics, together with known case studies, appropriate risk parameters can be established for the system to analyze the specific belt's risk level.

Accordingly, the system 100 can apply design knowledge of conveyor belts to determine the impact that damage densities will have to the strength of the conveyor belt. The system 100 uses universal conveyor design rules to rank specific damage densities as a function of location. The rules include applying an analysis of the conveyor belt based on damage densities and the impact to the conveyor belt specification for a given application.

The system 100 performs continuous monitoring of conveyor belts.

The belt 102 includes magnetizable cords along a longitudinal or running direction of the belt. The conveyor belt 102 can be a composite of these longitudinal cord with fabric, polymeric material and the like. The belt 102 can have one or more splices. The belt 102 can include transverse elements, such as fiber, fabric, steel cords and the like. The belt 102, in this example, includes magnetizable cords along a longitudinal or running direction of the belt. The belt 102 includes longitudinal steel cord elements that carry a load being conveyed.

The system 100 and/or circuitry 108 is configured to monitor damage density development over time, which can be used to determine location hot spots and trends of damage density clusters allowing customers to potentially identify causes for the damage. When used in this manner, the operator could limit damage to the conveyor belt. But this visual display of damage densities does not account for the cumulative effect of larger numbers of damage in the belt or the issues that mines have in determining what portions of the belt should be prioritized for replacement.

In order to resolve this issue, the selection of subsegments for replacement can be obtained by the system 100 by establishing a risk factor for each unit subsegment length that makes up the length of the belt and therefore generate a risk factor for the belt as a whole. This identifies clusters of hot spots that can be used to determine the optimal sections of belt to replace. Thus, a segment or subsegment can be identified for replacement.

In this instance, the belt is broken down into different areas, the conveyor belt consists of segments defined as a length of belt connected to an adjacent belt length with a splice or joint where the segments are joined together. In normal applications, one or more of these belt segments would make up a conveyor belt loop that transports material. For a portion of the segment to be replaced, the system 100 would define each segment by dividing the segment length into unit subsegments of a defined length. In an embodiment of this system, each unit subsegment could be broken into regions across the width of the subsegment. These regions can be monitored separately to assess the damage level in each region by calculating each regions damage density, from this data a damage density heat map can be generated.

In order to assess the risk impact of these damage regions, the system 100 could multiply each of these regional densities by a risk parameter, based on conveyor design and application, that is associated with the location of the subsegment region relative to the belt width. The product of the subsegment region density multiplied by the associated region risk parameter defines an individual risk factor for each region.

The risk parameter can be a rated risk level between 1-10 associated with the location of the region across the width of the conveyor, as defined by the belts construction or design and by the conveyor application, which includes consideration of transition zones, idler design, pulley diameters, belt tensions, etc). For example, in a conventional conveyor belt application, the outside edges of the conveyor would normally have higher tensions and as such this area would have a higher risk parameter.

The system 100 could then assign each unit subsegment length of conveyor belt with a risk factor by adding the risk factors across the unit length of the conveyor belt. For example, a 10 m length of the conveyor belt could define a unit length of the conveyor segment along the belt length. As discussed, the risk factors are dependent on the density map and the position of the damages (edges or center) that represent the density. Using the risk factor, it is possible to calculate the risk that the damages pose relative to loss of belt strength and hence make a recommendation to replace. By summing the risk factors across the width of the belt, the risk for a given length of the conveyor can be determined. It is important to note that with a repair there is an addition to the belt's magnetic signature, which would need to be considered in future analysis of the same area and potentially this repair region would need to have special consideration for calculation of the risk factor.

In one embodiment of the system 100, a given length of replacement conveyor belt can be specified by the user and the system would determine the best segment or subsegment for replacement by considering the reduction of the operational risk as determined by the calculated risk factors. Using the specified length, a defined number of cells could be used to calculate a running average of the unit section of belt length in order to find the portion of the conveyor with the largest area under the running average risk factor plot, over the length of the conveyor. This can be utilized as a belt Risk Index for the region of belt that should be replaced based on the density information alone. Similarly, this same risk index could be calculated and displayed for each segment or for the overall belt to monitor the overall impact of the belt replacement.

The conveyor belt 102 can include a polymeric top cover material, including but not limited to rubber, PVC, polyurethane and the like, a reinforcing or protective ply (plies)/layer(s) having a fabric/textile layer and a bottom-coated polymeric layer.

Some example compositions of plies/layers for the belt 102 include:
- Polymer—Textile #1—Textile #2— . . . —Textile #N—Polymer Layers (where there can be 1 to N textile-reinforcing layers)
- Polymer—Textile Breaker—Steel Cord—Polymer Layers
- Polymer—Steel Cord—Textile Breaker—Polymer Layers
- Polymer—Textile Breaker—Steel Cord—Textile Breaker—Polymer Layers It is appreciated that the system 100 is monitoring the steel cords.

Figure 3:
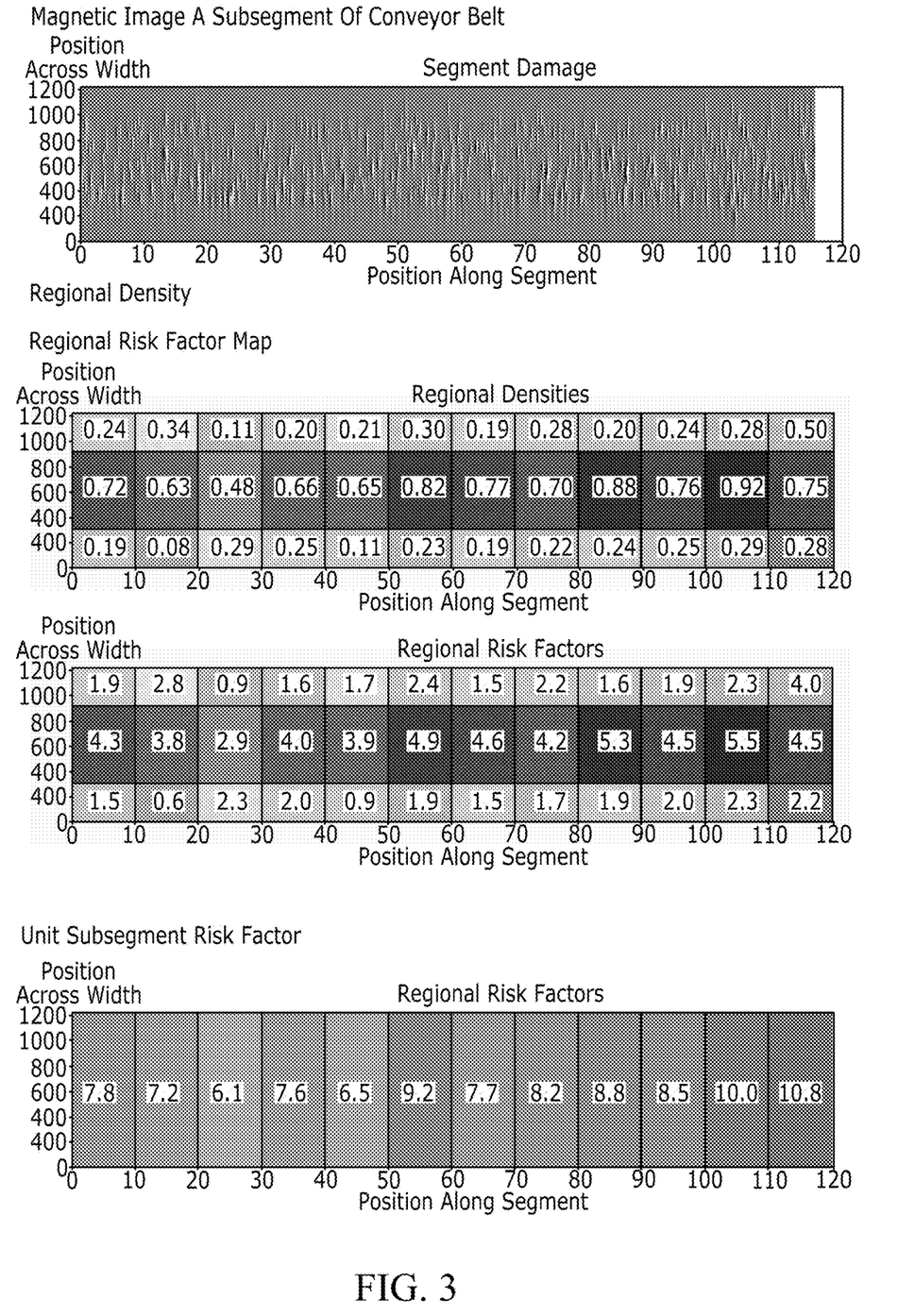
FIG. 3 is a diagram illustrating measured magnetic responses for segments of an example conveyor belt 102 in accordance with one or more embodiments.

The belt 102 is divided into a plurality of sections referred to as segments. These segments typically start and end at a belt splice. A single segment of the belt 102 is shown in FIG. 1 for illustrative purposes. Each segment is further divided into subsegments, based on a unit length of the conveyor. FIG. 3 shows an example of a segment with suitable subsegments. In one example, the subsegments are substantially rectangular in shape and can comprise one or more regions across a width of the belt. In this example, there is a middle/center region, a left edge region and right edge region. The unit length of the subsegments means the system will utilize a fixed length of the segment, e.g. 10 meters, and each fixed length of conveyor belt is divided into left, center, and right regions. It is appreciated that other suitable configurations for the subsegments are contemplated.

The generator array 104 generates and applies a magnetic field to a portion of the conveyor belt 102. The portion is generally below the generator array 102. As a result, the cords are magnetized and generate a magnetic field, referred to as the cord magnetic field.

The sensor array 106 measures a magnetic response based on the cord magnetic field for each segment of the belt 102. The array 106 is spaced to cover a width of the belt 102.

The sensors themselves could be inductive coils or solid-state magnetic field sensors (e.g., Hall Effect sensors or magnetoresistive sensors).

The measured response for each subsegment is translated to damage densities and compared with expected responses and previous responses to determine damage or variation for each subsegment by the circuitry 108.

The damage density is typically the average magnetic field for the area of a region. The assumption is that no damage means no magnetic field, a small damage results in a low intensity magnetic field over the given area of the region, and a large damage results in a high intensity magnetic field over a given area. The larger the number and size of the damages, the larger the normalized density is for a given subsegment region. The damage density is calculated per pass or revolution of the conveyor belt 102.

The circuitry 108 is configured to generate subsegment based conveyor belt characteristics based on the measured magnetic response. These characteristics can include a full or partial magnetic map of the conveyor belt, damage images, complete or partial cord breaks due to impact, corrosion, trapped material or similar damage events.

It is appreciated that the damage analysis and density analysis can be analyzed together in determining belt replacement sections.

Figure 2:
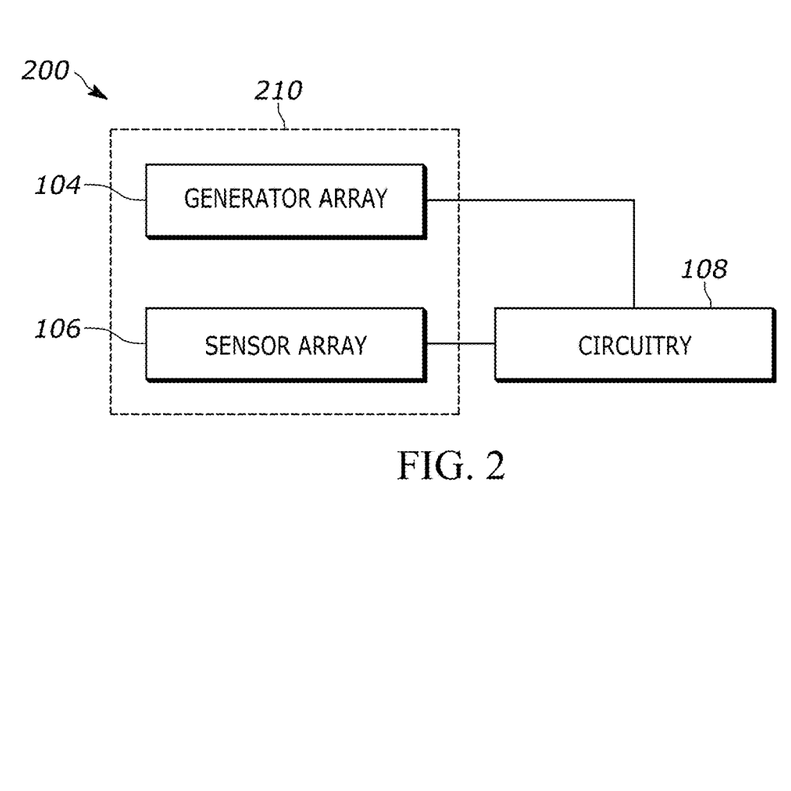
FIG. 2 is a diagram illustrating a system 200 for scanning a conveyor belt in accordance with one or more embodiments.

FIG. 2 is a diagram illustrating a system 200 for scanning a conveyor belt in accordance with one or more embodiments. The system 200 is provided for illustrative purposes and it is appreciated that suitable variations are contemplated.

The system 200 is substantially similar to the system 100 and includes additional details about circuitry 108.

The system 200 includes the circuitry 108, the generator array 104 and the sensor array 106.

The circuitry 108 is configured to obtain the measured magnetic response from the sensor array 106 and generate subsegment based conveyor belt characteristics based on the measured magnetic response. Additionally, the circuitry 108 is configured to determine and identify when subsegments or segments should be repaired and/or replaced.

The circuitry 108 can utilize existing system magnetic scan data. For example, the circuitry 108 can explore past data sets where the belt was either recommended for replacement or failed in service and utilize these datasets to establish initial density thresholds that will be applied to a subsegment density analysis. The past data sets include measured magnetic responses for the segments of a belt 102.

FIG. 3 shows diagram(s) illustrating measured magnetic responses for a portion or subsegment of an example conveyor belt 102 in accordance with one or more embodiments.

A first or top diagram shows a magnetic image of a subsegment of a conveyor belt.

A second diagram, below the first, shows regional densities.

A third diagram, below the second, shows regional risk factors.

A fourth diagram, below the third, shows unit subsegment risk factors.

This image can be broken down into regional segments and the density values for these regional segments can be calculated based on the magnetic response for the conveyor belt 102 based on magnetic field strength. The darker density indicates severe damage whereas the lighter density indicates minor or less severe damage densities.

Based on the size and position of the regions, regional risk factors can be calculated for each of the density regions. The regional risk factor incorporates the measured density as well as consideration of belt, conveyor and process risks in order to calculate the regional risk factor. The darker the regional indicates a higher risk area of the conveyor sub-segment whereas the lighter risk factor indicates minor or lower risk area.

Summing the transverse regional risk factors associated with the unit subsegment length utilized, a unit subsegment risk factor can be determined for each unit length. In FIG. 3, the unit subsegment length was 10 m. These unit risk factors are used to determine the risk associated with that length of conveyor belt. The darker the unit subsegment indicates a higher risk factor in that area of the conveyor whereas the lighter unit risk factor indicates minor or lower risk area.

Example risks include belt condition, conveyor design and a process condition.

The belt condition can include risks associated with the belt safety factor, step length, damage density, belt strength and the like.

The conveyor design includes risks associated with transition length, drop height, chute design, idler (angle, gap, etc), horizontal turns, vertical turns and the like.

The process condition includes risks associated with belt cleanliness, pulley lagging condition, material build up on conveyor structure and the like Based on these identified risks, a risk parameter for each transverse unit region of the conveyor can be established, the regional risk parameters provide a means of weighting each regional risk factor appropriately for their associated risk. This allows for the risk parameters to be varied in accordance with the conveyor design, belt specification and condition of the conveyor. The regional risk factors are then calculated such as to rank each region's contribution to the belt's risk.

A higher overall risk factor indicates a potential problem with the conveyor belt of the system in that region. Thresholds can be applied to the individual risk factors or the overall risk factor, and values exceeding these thresholds would generate an alarm.

In an example of the calculation of the normalized density, the system may calculate a normalized density using the measured magnetic signal from the segment splices given this is specific for the conveyor design, specifically the cord diameter and pitch. This could provide a standard for the expected signal of a break and allows for the system to assign a normalized value to which each region will be normalized to, based on its area.

Using the belt application and belt design information, regional risk parameters can be assigned, for example, as a number between 1-10. 1 being a low risk and 10 being the highest risk for a given region. The risk factor for a region is simply calculated by multiplying the region's risk parameter by its normalized density. In the current example where the width is broken into two edge regions and a center region, there would be three risk factors calculated for the three regions across the belt. This could be used to generate a unit risk factor heat map. The risk factor for a unit length for a specific sub-segment, could simply be a sum of these risk factors. Given that the densities are normalized and the highest risk factor per region is 10, the sum of the risk factors of a unit sub-segment will always be equal to or less than 30.

In this example, if the normalized densities of the farthest left unit segment were 0.24, 0.72, 0.19 for the left edge, center and right edge, respectively, and the risk parameters across the width of the belt were 8, 6, 8, the risk factors would be 1.9, 4.3, 1.5 for the left edge, center and right edge regions of the belt. The unit sub-segment's risk factor would then be 1.9+4.3+1.5 or 7.8. The lower the damage density in the regions across the width of a unit subsegment, the lower the calculated risk factor; alternatively, the higher the damage density across the regions of a given unit subsegment, the higher the unit risk factor value and hence the higher the risk associated with that unit length of conveyor belt.

Figure 4:
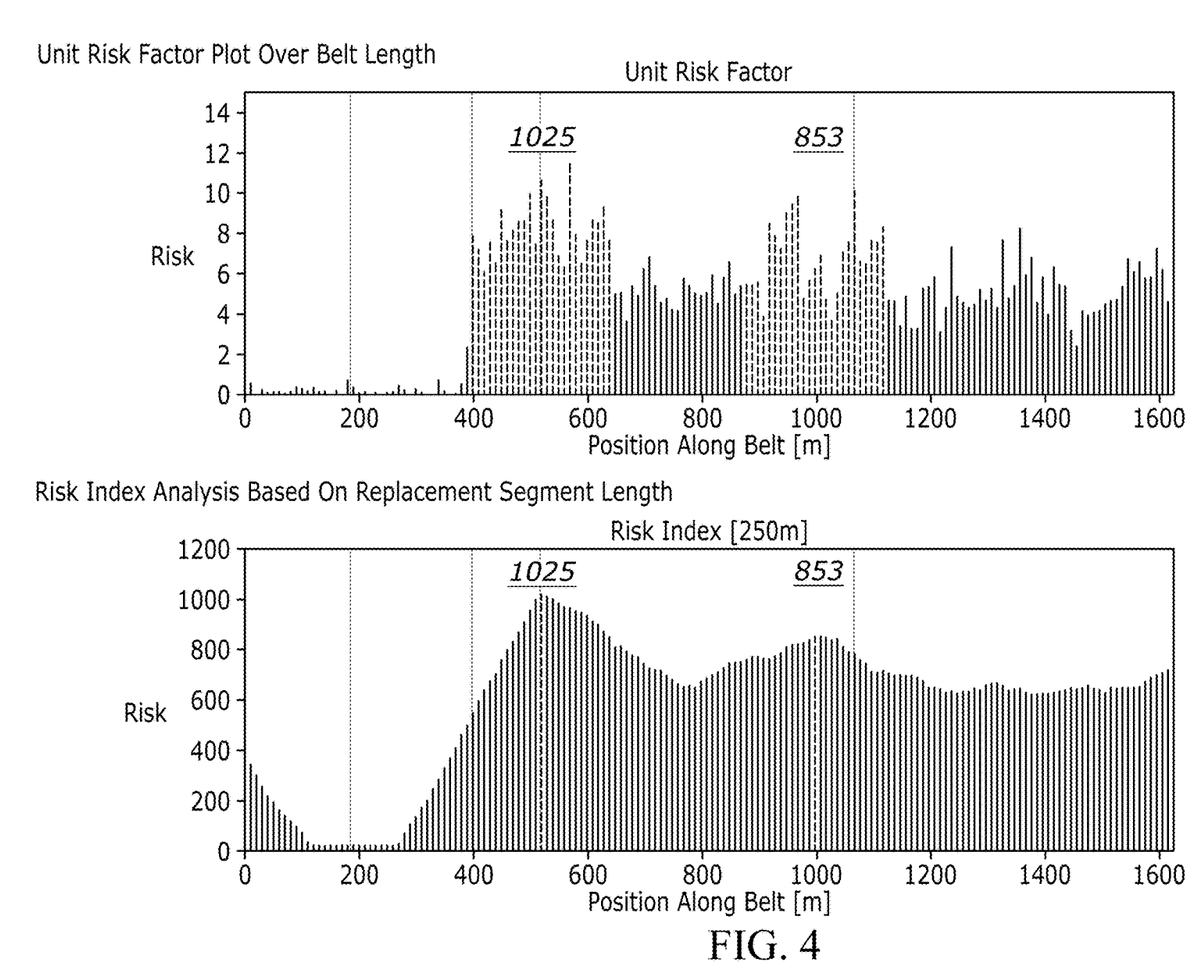
FIG. 4 is a diagram illustrating another example of measured magnetic responses for segments of an example conveyor belt 102 in accordance with one or more embodiments.

FIG. 4 shows the unit risk factors calculated for the entire conveyor belt length. A top diagram shows the unit risk factor plot of belt length and a bottom shows risk index analysis based on replacement segment length.

Based on the amount of belt that the customer wants to replace in the conveyor, one embodiment could utilize a running average of these risk factors over the specified belt replacement length to identify the peak risk areas for that length of belting. The running average values could provide a risk index number to quantify the risk associated with that region of the conveyor belt. The peak values of the risk index plot indicate the portion of the conveyor with the highest associated risk based on damage density and the location of the highest damage density levels, labelled as 1025 and 853 in FIG. 4. The peak risk index numbers in the risk index plot are also highlighted in the unit subsegment risk factor plot, together with the calculated risk index values for these peak regions.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory.

One general aspect includes a system for monitoring conveyor belts. The system also includes a magnetic scanner configured to measure a magnetic field generated for a conveyor belt, the belt having magnetizable cords. The system also includes one or more processors configured to: detect damage positions relative to length and width of the conveyor belt, determine a plurality of densities for a plurality of subsegment regions of a segment of the conveyor belt based on the measured magnetic field, apply a plurality of risk parameters to the plurality of densities to generate a plurality of risk factors for each subsegment region, generate a plurality of risk factors for the plurality of unit subsegments based on the plurality of risk factors, and identify high risk subsegments based on the plurality of risk factors.

Implementations may include one or more of the following features. The one or more processors configured to generate the plurality of risk factors based on past magnetic scan data sets and locations of each subsegment region. The system may include a memory configured to store the past magnetic scan data sets of the conveyor belt. The past magnetic scan data sets may include at least a damaged subsegment. The plurality of unit subsegments may include a single region. The plurality of subsegments may include left belt edge, center and right belt edge regions. The plurality of subsegments units are divided into multiple regions. The one or more processors configured to determine the plurality of densities based on the measured magnetic field for each subsegment region. The conveyor belt may include one or more additional segments separated by splices. The plurality of risk factors indicating damage level within each of the plurality of subsegment regions. The one or more processors are configured to analyze the identified high risk unit subsegments to select subsections for prioritization of belt repair or replacement. The one or more processors configured to analyze the identified high risk subsegments to modify operating conditions may include modifying loading of belt and speed of belt. The measured magnetic field data is for one revolution of the conveyor belt and the field is stored for the one revolution. The one or more processors are configured to identify high risk subsegments or segments based on the cumulative risk index assessment of adjacent unit subsegments along the length of the segment. The plurality of densities are at least partially based on the unit subsegment area. The system where if the magnetic field of the entire subsegment is at a background level, then the damage density is 0%, if half the cell has a magnetic signal that is above the background level, then the density is 50%. The density is further based on a magnitude of the magnetic field in addition to the area. The risk factors being based on environmental conditions and/or location. The density is analyzed with a damage analysis in determining belt replacement sections. The individual cell risk parameter would include a component associated with an individual damage analysis in the subsegment. Implementations of the described techniques may include hardware, a method or process, or computer software on a computer-accessible medium.

Additionally, a processor can refer to an integrated circuit, an Application Specific Integrated Circuit, a Digital Signal Processor, a Field Programmable Gate Array, a Programmable Logic Controller, a Complex Programmable Logic Device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second", and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially-relative terms, such as "inner", "adjacent", "outer", "beneath", "below", "lower", "above", "upper", and the like, may be used herein for ease of description to describe one element or feature's relationship to another element(s) or feature(s) as illustrated in the figures. Spatially-relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially-relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for monitoring segments of conveyor belts, the system comprising:
a magnetic scanner configured to measure a magnetic field generated for a segment of a conveyor belt, the belt having magnetizable cords; and
one or more processors configured to:
detect damage positions relative to length and width of the conveyor belt segment;
determine a plurality of regional damage densities for a plurality of subsegment regions of the segment of the conveyor belt based on the measured magnetic field;

generate a plurality of risk parameters based on at least tension and location of the plurality of subsegment regions;

apply the plurality of risk parameters to the plurality of densities to generate a plurality of risk factors for ach the plurality of subsegment regions;

identify high risk subsegments based on the plurality of risk factors for replacement.

2. The system of claim 1, the one or more processors configured to generate the plurality of risk factors based on past magnetic scan data sets and locations of each subsegment region.

3. The system of claim 2, further comprising a memory configured to store the past magnetic scan data sets of the conveyor belt.

4. The system of claim 3, the past magnetic scan data sets comprising at least a damaged subsegment.

5. The system of claim 1, the plurality of unit subsegments comprising a single region.

6. The system of claim 1, the plurality of subsegments comprising left belt edge, center and right belt edge regions.

7. The system of claim 1, the plurality of subsegments units are divided into multiple regions.

8. The system of claim 1, the one or more processors configured to determine the plurality of densities based on the measured magnetic field for each subsegment region.

9. The system of claim 1, the conveyor belt comprising one or more additional segments separated by splices.

10. The system of claim 1, the plurality of risk factors indicating damage level within each of the plurality of subsegment regions.

11. The system of claim 1, the one or more processors configured to analyze the identified high risk unit subsegments to select subsections for prioritization of belt repair or replacement.

12. The system of claim 1, the one or more processors configured to modify loading of belt and speed of belt based on identified high risk subsegments.

13. The system of claim 1, the measured magnetic field data is for one revolution of the conveyor belt and the field is stored for the one revolution.

14. The system of claim 1, the one or more processors configured to identify high risk subsegments or segments based on the cumulative risk index assessment of adjacent unit subsegments along the length of the segment.

15. The system of claim 1, the plurality of densities are at least partially based on the unit subsegment area.

16. The system of claim 15, where if the magnetic field of the entire subsegment is at a background level, then the damage density is 0%, if half the cell has a magnetic signal that is above the background level, then the density is 50%.

17. The system of claim 16, the density is further based on a magnitude of the magnetic field in addition to the area.

18. The system of claim 1, the risk factors being based on environmental conditions and/or location.

19. The system of claim 1, the plurality of subsegment regions comprise first edge regions, center regions and second edge regions.

20. The system of claim 19, the plurality of subsegment regions are arranged in regional units comprising a first edge region, a center region and a second edge region that extends across a width of the segment, and the one or more processors determine regional risk factors for the regional units of subsegments.

* * * * *